(12) United States Patent
Uppili (10) Patent No.: US 11,070,445 B2
(45) Date of Patent: Jul. 20, 2021

(54) SYSTEM AND METHOD FOR OPTIMIZATION OF AN OVER-THE-TOP (OTT) PLATFORM

(71) Applicant: Tambora Systems Singapore Pte. Ltd., Singapore (SG)

(72) Inventor: Anand Uppili, Bangalore (IN)

(73) Assignee: TAMBORA SYSTEMS SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/597,867

(22) Filed: Oct. 10, 2019

(65) Prior Publication Data

US 2020/0244547 A1 Jul. 30, 2020

(51) Int. Cl.
| | |
|---|---|
| H04L 12/24 | (2006.01) |
| H04W 28/02 | (2009.01) |
| H04L 29/08 | (2006.01) |
| H04L 12/26 | (2006.01) |
| H04B 17/318 | (2015.01) |

(52) U.S. Cl.
CPC ....... *H04L 41/5009* (2013.01); *H04B 17/318* (2015.01); *H04L 41/0823* (2013.01); *H04L 41/0883* (2013.01); *H04L 41/0886* (2013.01); *H04L 41/0896* (2013.01); *H04L 41/142* (2013.01); *H04L 41/5067* (2013.01); *H04L 43/08* (2013.01); *H04L 67/2842* (2013.01); *H04W 28/0236* (2013.01); *H04W 28/0268* (2013.01)

(58) Field of Classification Search
CPC ............. H04L 41/5009; H04L 41/0823; H04L 41/0883; H04L 41/0886; H04L 41/0896; H04L 41/412; H04L 41/5067; H04L 43/08; H04L 67/2842; H04L 65/604; H04B 17/318; H04W 28/0236; H04W 28/0268; G10L 19/173
USPC ........................................................ 709/224
See application file for complete search history.

(56) References Cited

U.S. PATENT DOCUMENTS

| | | | |
|---|---|---|---|
| 2008/0205389 A1* | 8/2008 | Fang | ........................ H04L 65/80 370/389 |
| 2009/0083279 A1* | 3/2009 | Hasek | .............. H04N 21/23439 |
| 2009/0185618 A1 | 7/2009 | Liu et al. | |
| 2013/0290492 A1 | 10/2013 | ElArabawy et al. | |

(Continued)

FOREIGN PATENT DOCUMENTS

| | | |
|---|---|---|
| WO | 20130048484 A1 | 4/2013 |
| WO | 20160091292 A1 | 6/2016 |

*Primary Examiner* — Tan Doan
(74) *Attorney, Agent, or Firm* — Rangarajan Sourirajan (57) ABSTRACT

A system to optimize resource utilization in an over-the-top (OTT) platform to improve Quality of Experience of viewing a video at the user devices in a mobile communication network is provided. The system is operably coupled to a sensing unit for receiving a sensory input parameters from the user devices, mobile network operator, and an OTT platform, a sensing unit generates a sensed data using received sensory input data; a processing unit receives and process the generated sensed data to determine changes required in a resolution of video provided to the user devices, if resolution of video is below a threshold value; an acting unit provides instructions to OTT platform to stream video to the user devices over a constant bandwidth or constant resolution to prevent transcoding and transrating and conserver resource utilization at OTT platform.

20 Claims, 4 Drawing Sheets

(56) References Cited

U.S. PATENT DOCUMENTS

| | | | |
|---|---|---|---|
| 2015/0381690 A1* | 12/2015 | Schmidt | H04L 65/607 |
| | | | 709/231 |
| 2017/0104609 A1* | 4/2017 | McNamee | H04M 15/61 |
| 2018/0014051 A1 | 1/2018 | Phillips et al. | |
| 2018/0131580 A1* | 5/2018 | Tomkins | H04L 41/0823 |
| 2018/0270524 A1* | 9/2018 | Jones | H04N 9/8045 |
| 2019/0254108 A1* | 8/2019 | Iwai | H04W 76/27 |

* cited by examiner

SYSTEM AND METHOD FOR OPTIMIZATION OF AN OVER-THE-TOP (OTT) PLATFORM

CROSS-REFERENCE TO RELATED APPLICATIONS

This application claims priority to and the benefit of the non-provisional patent application titled "System and Method for Optimization of an Over-The-Top (OTT) Platform", application number 201941003078, filed in the Indian Patent Office on Jan. 25, 2019. The specification of the above referenced patent application is incorporated herein by reference in its entirety.

BACKGROUND

In this modern age of technology, the internet is touching almost every part of our digital life. With connectivity between user devices, for example, electronic devices, mobile phones, etc., becoming ubiquitous, the number of internet applications as well as users has ballooned over the last few years and continues to grow at a phenomenal rate. As any such new-age ecosystems face, there are also challenges with this phenomenal growth. One of the biggest challenges for the internet is the assurance or guarantee of Quality of Experience. Be it un-buffered, high-quality video or ability to provide uninterrupted connectivity for an e-commerce site during a purchase. With the advent of new-age internet applications such as Internet-of-Things, self-driving cars, online video games and so on, the challenge of guaranteeing Quality of Experience has increased. The quality of assurance now moves from just assuring bandwidth to other factors such as latency, assured connectivity, etc.

Moreover, the mobile communication network has limited bandwidth for data transmission; due to which video streaming services over a mobile communication network are affected, for example, a data loss in data transmission. Due to data loss, guaranteed streaming video quality is not obtained at the user devices. Therefore, the study of video streaming over mobile communication network is critical to enhancing the Quality of Experience of viewing a video in the user devices.

Furthermore, the present internet applications and mobile communication networks function independently without understanding the capability of the other. The mobile communication networks are not concerned with the type of applications running on the user devices to optimize the mobile communication networks. Similarly, internet applications are not concerned with the capability of the mobile communication networks used for communications.

Generally, multiple users would like to view a high resolution of a video over a network. However, to view a high resolution video of a video file, a large number of resources are required. Transcoding and/or transrating are performed at an over-the-top (OTT) platform to obtain a required resolution if it is not possible to provide the required resolution to the user devices, as per the user's subscription plan. Therefore, conserving utilization of the resources over a mobile communication network is critical.

Hence, there is a long felt but unresolved need for a method and system to optimize resource utilization at the service provider. Moreover, there is a need for a method and system to improve Quality of Experience of viewing a video in one or more of the end-user devices. There is a need for a method and system to build a bridge between the internet applications and mobile communication networks so as to collect and process the user experience data in real time based on three fundamental principles they are: Sensing the current quality the user is experiencing, Processing the sensed data, that is sent to a management platform in the cloud and action need to be taken to initiate optimization changes to the mobile communication network to improve the Quality of experience for end-user devices. Furthermore, there is a need for a method and system to reduce transcoding and transrating performed at an over-the-top (OTT) platform providing the video and conserve resource utilization at the OTT platform.

SUMMARY OF THE INVENTION

This summary is provided to introduce a selection of concepts in a simplified form that are further disclosed in the detailed description of the invention. This summary is not intended to determine the scope of the claimed subject matter.

The method and system disclosed herein addresses the above-recited need for optimizing resource utilization in an over-the-top (OTT) platform in order to improve the Quality of experience for one or more of the end-user devices. Moreover, the method and system disclosed herein receives the sensory data, and determines the changes required in the sensory data to improve Quality of Experience of viewing a video on the one or more of the end-user devices in a mobile communication network. Furthermore, the method and the system disclosed herein conserve the resources at the service provider. For example, the method and the system disclosed herein prevents transrating and transcoding performed by the service provider, thereby optimizing resource utilization at multiple devices, for example, end-user devices, service providers, etc., connected to the mobile communication network.

The method disclosed herein optimizes resource utilization in an over-the-top (OTT) platform to improve the Quality of Experience of viewing a video in the one or more of the end-user devices connected to the mobile communication network. The system comprises a sensing unit for receiving a plurality of sensory input parameters from one or more of the end-user devices, a mobile network operator, and the OTT platform. The sensory input parameters received from the OTT platform comprise transcoding and transrating performed at OTT platform. The sensing unit generates sensed data using received sensory input parameters. The system further comprises a processing unit for receiving generated sensed data. The processing unit processes the generated sensed data to determine changes required in a resolution of a video provided by the OTT platform to one or more of the end-user devices, if resolution of the video is below a threshold value. The system further comprises an acting unit for providing instructions to the OTT platform to stream the video to the one or more of the end-user devices receiving the video with a resolution below the threshold value. The instructions provided to the OTT platform comprise instructions to transmit video at a constant resolution, where the constant resolution is the threshold value or above the threshold value. The instructions provided to the OTT platform further comprise instructions to transmit the video over a constant bandwidth to each of one or more of the end-user devices. Transmitting the video at one of a constant resolution and a constant bandwidth prevents transcoding and transrating at the OTT platform, thereby conserving resource utilization at the OTT platform.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
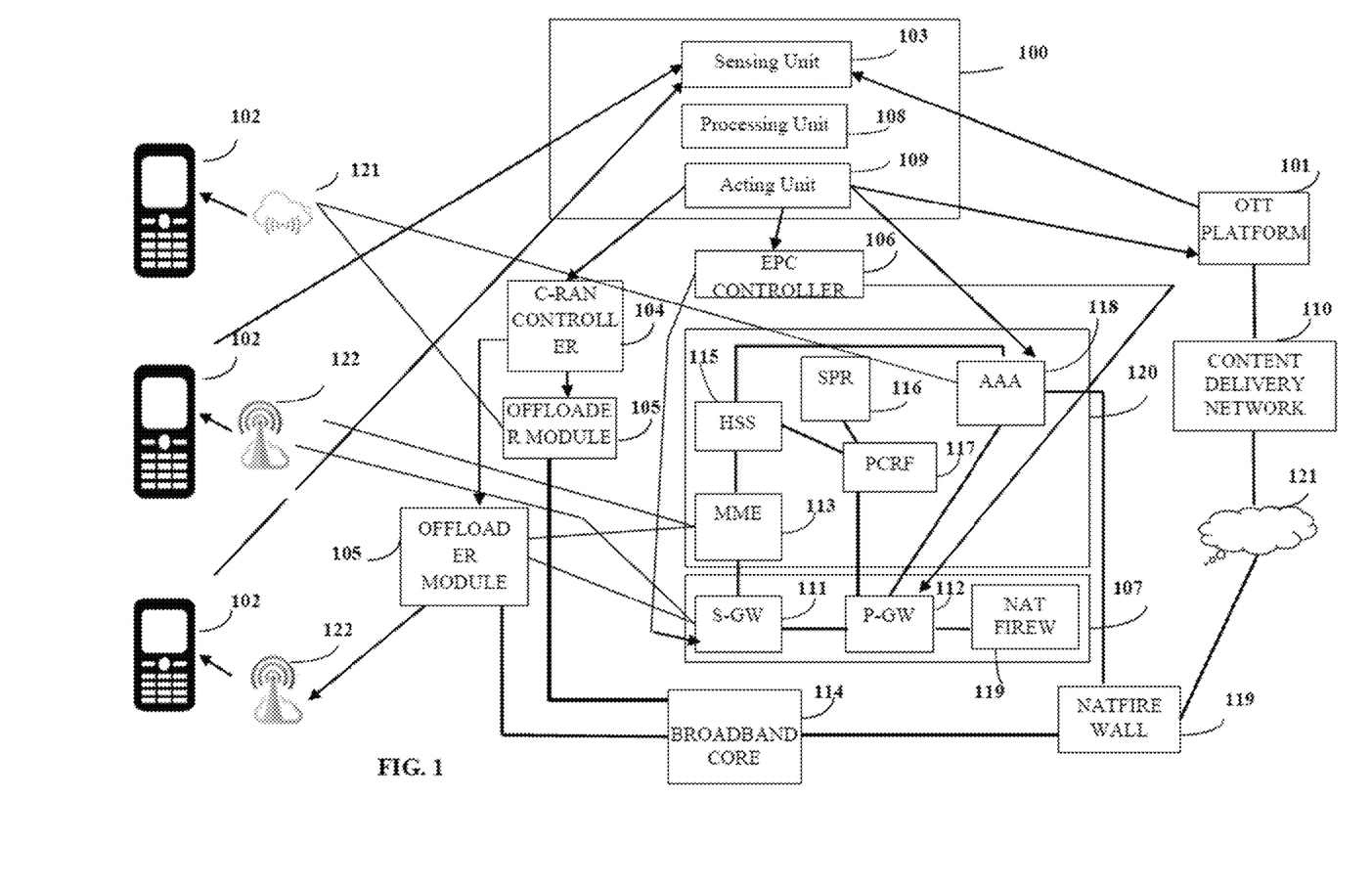
FIG. 1 exemplarily illustrates system to optimize resource utilization in an over-the-top (OTT) platform over a mobile communication network.

FIG. 1 exemplary illustrates a system 100 to optimize resource utilization in an over-the-top (OTT) platform 101 to improve Quality of Experience of viewing a video in one or more of the end-user devices 102 in a mobile communication network. As used herein, the term "Quality of experience" is a measure of an experience of a video quality when the end-user device 102 is viewing a video. The Quality of experience inputs are provided through a plurality of sensory parameters to the sensing unit 103, for instance, the type of android application package (APK) running on the end-user devices 102, information on radio link strength and quality for example, received signal strength indicator (RSSI) and carrier to interference-plus-noise ratio (CINR) from the Mobiles, traffic data, for instance, video statistics, video contents consumed by the end-user device 102 and/or their uniform resource locator (URLs), when the user logs on to view and/or consume the content, current bandwidth and/or the quality of the said videos, the times of viewing, whether any buffering occurred, the total number of video bytes consumed, wherein sensory parameters are also referred to a sensory data. Also, as used herein, the term "OTT platform" refers to the content and/or service provider 101 to the end-user devices 102 over a network, the OTT platform provides a plurality of sensory parameters to the sensing unit, wherein content includes resources required for performing transcoding and transrating on the video viewed by one or more of the end-user devices, computational resource, for example, CPU utilization, current latency obtained by user devices 102. Also, as used herein, the term "mobile communication network" refers to radio access network (RAN), mobile network as defined in 3GPP standards, with Node-Bs/e-Node-Bs, the Evolved Packet Core (EPC) including the Mobility Management Entity (MME), Serving Gateway (S-GW) and Packet Data Network Gateway (P-GW), etc., one of the internet, an intranet, a wireless network, a mobile telecommunication network such as a code division multiple access (CDMA) network, a third generation (3G) mobile communication network, a fourth generation (4G) mobile communication network, a fifth generation (5G) mobile communication network, a long-term evolution (LTE) mobile communication network, etc., or a network formed from any combination of these networks.

The system 100 disclosed herein comprises the resource optimization platform operably coupled to a mobile communication network; a mobile device also refers to user equipment (UE) 102 is configured with mobile communication network, wherein the mobile device 102, for example, a smartphone, a gaming console, a personal digital assistant (PDA) or tablet, a Laptop, an internet of thing devices like a sensor or an actuator attached to and/or providing information about a vehicle like for instance, a car, or an appliance such as a home appliance or a smart meter, or any other platform configured to access the communication network, etc.

The system 100 disclosed herein comprises the resource optimization system operably coupled to a sensing unit 103, herein the sensing unit 103 receives a plurality of sensory data from the UE 102, for example, traffic data, network inputs, and QoE inputs and from over-the-top (OTT) platform 101, for example, resources for performing transcoding and transrating on the video viewed by one or more of the end-user devices 102, computational resource, for example, CPU utilization, current latency obtained by one or more of the end-user devices 102 for the service being given to the end-user 102 and the sensing unit 103 also receives a plurality of sensory data from mobile network operator, for example, mobile station international subscriber directory number (MSISDN) of one of an individual end-user devices 102 and mobile internet protocol (IP) address, wherein mobile network operator provides MSISDN to each of one or more of the end-user devices 102 to identify a mobile phone number internationally. In the system 100 disclosed herein, the UE 102, over-the-top (OTT) platform 101, a mobile network operator, etc. are positioned at different places over the network.

In one embodiment, Quality of experience is a measure of a video quality experienced when the end-user 102 is viewing a video. The Quality of experience inputs are provided through a plurality of sensory data to the sensing unit 103 for instance, the type of application (APK) running on end-user devices 102 or a Software Development Kit (SDK) integrated into another application that is running on a mobile device, a gaming console, a PDA or tablet, a Laptop, either in the foreground or background, sensing the OS (Operating System like for example, Android) running on the end device. An Intelligent Logic that resides in different points in the mobile communication network, for instance, a Network Address Translator (NAT) 119 Interface, a Dynamic Host Configuration Protocol (DHCP) Interface, an S6a Interface, a 3GPP user authentication, authorization and accounting (AAA) server 118, S1-MME 113, GTPv2, Gx, Gy, Sp interfaces and/or combinations thereof, that provide the IP address mapping to the MSISDN, information on radio link strength and quality (RSSI and CINR) from the mobiles, traffic data comprises video statistics, video contents consumed by the end-user devices 102 and/or their URLs, there is a script running on the content server or content delivery network (CDN) 110 server that gets loaded onto the end-user devices 102 to collect the required information about when the user is log-in to view and/or consume the content, current bandwidth and/or the quality of the said videos, the times of viewing, whether any buffering occurred, total number of video bytes consumed, vital information about subscriber location like LAC/TAC (Location Area Code/Tracking Area Code), online and offline charging system parameters of each of the Network operators taken from the Gy and/or Gz and Sh interfaces as defined in the 3GPP standards TS 32.296 and TS 32.240, TS 32.251 and TS 32.299, and TS 29.329 including number of bytes consumed per service and the cost, NodeB and/or eNodeB details including the Cell IDs, policy applied, user profile, usage of data, policy updates etc., detected through end-user devices 102 and resource utilization in the RAN including radio resources and computational resources like CPU utilization detected through NodeB/eNodeB, and the current video quality being given by the service provider 101 to the end-user devices 102.

As exemplarily illustrated in FIG. 1, the system 100 comprises a storage unit for storing a set of rules and/or instructions and at least one processor 108 communicatively coupled with the storage unit and operably coupled to the sensing unit 103. As used herein, storage unit comprises a rule engine which is communicatively coupled with the mobile network operator. The machine learning algorithms are stored in the rule engine for handling complex network slicing operation. For a complex network slicing operation, the rule engine is configured to change or modify the set of rules by changing the scheduling policies at the radio access networks based on the needs of the users 102. As used herein, the machine learning algorithm refers to all learning algorithm, for example, traditional batch mode learning methods such as decision trees, support vector machines, bayesian networks, clustering, ensemble learning algorithms, and Markov Chain Monte Carlo (MCMC) algorithms as well as versions of these algorithms adapted to data stream processing. The machine learning algorithm can operate in supervised, semi-supervised or unsupervised learning mode depending on the amount of labeled training data available. Based on the video quality predictions, the rule engine provides actionable recommendations to the wireless network for addressing QoE issues.

The system 100 comprises a sensing unit 103, a processing unit 108, an acting unit 109 communicatively coupled with the storage unit. The sensing unit 103 dynamically receives sensory data from the plurality of UE 102 comprising video attributes, for example video contents consumed by the end-user devices 102 and/or their URLs, when the user is log-in to view and/or consume the content, current bandwidth and/or the quality of the said videos, the times of viewing, whether any buffering occurred, total number of video bytes consumed etc. Further, the sensing unit 103 dynamically receives the sensory data from the service provider 101, for example, computational resource refers to CPU utilization, etc. The sensing unit 103 dynamically receives the sensory data from the mobile network operator, for example, mobile IP address, MSISDN of the user equipment 102. The processing unit 108 receives the sensory data from the sensing unit 103 and the processing unit 108 is functionally coupled to the acting unit 109.

In one embodiment, the processing unit 108 and the storage unit is configured to cloud-based services implemented in a cloud computing environment, where computing resources are delivered as a service over the network. The system 100 is a cloud computing based platform implemented as a service for determining resource optimization in OTT platform 101.

The system 100 comprises a first controller 104 and a second controller 106 for controlling the data transmission from origin to the destination and is operably coupled to the processing unit 108 over a network. The first controller 104 refers to Cloud and/or centralized radio access network (CRAN) and orchestrator, wherein, CRAN connects UE 102 to the cellular antenna, process the data and transmit it to the mobile communication network, herein orchestrator refers to a software-defined networking (SDN) Orchestration, wherein SDN is a process of automatically programming behavior of the network, so that the network smoothly coordinates to support applications and services. The first controller 104 transmits processed data to off-loader module 105. The processed data from the off-loader module 105 are transmitted to the UE 102 as per user capabilities of utilizing video resources over the network. Another key service for distribution of video content over broadband core 114 wireless networks is the 3GPP Multimedia Broadcast and Multicast Service (MBMS). MBMS enables distribution of video and other content from a single source (content provider) 101 to multiple end-users (UEs) 102 simultaneously with efficient utilization of radio resources.

The second controller 106 comprises an evolved packet core (EPC) network function virtualization (NFV) controller 106 and orchestrator and a second controller 106 is further communicatively coupled to a control plane 120 and a data plane module 107, wherein data plane module 107 comprises a serving gateway (S-GW) 111 and a packet data node gateway (P-GW) 112 to route data through the mobile communication network and to manage quality of service of viewing a video in one or more of the end-user devices 102.

In an embodiment, the EPC 106 comprises a Serving Gateway (S-GW) 111, a packet data node gateway (P-GW) gateway 112, and a NAT (Network Address Translator) firewall 119. The eNB (Evolved Node B) (the base station) 122 uses the S1-AP (Application Protocol) protocol on an S1-MME interface with the MME 113 for control plane traffic 120, and the eNodeB 122 uses the General Packet Radio Service (GPRS) Tunneling Protocol (GTP) on an S1-U interface with the S-GW 111 for user plane traffic. As used herein, S1-AP refers to services between MME 113 and eNB 122, for example, mobility functions for UE 102, Paging, Reset functionality, NAS signaling transport function, error reporting, UE 102 context release function, and status transfer. As used herein S1-U interface refers to an interface where S-GW 111 supports the S1-U interface with eNodeB 122 and S5/S8 data plane module 107 with P-GW 112, wherein S5/S8 interface refers to an interface were data plane module 107 and control plan 120 support S5/S8 interface with P-GW 112. Collectively the S1-MME and S1-U interfaces are known as the S1 interface, which represents the interface from eNB 122 to the core EPC 106.

The MME 113 is a control-node for RAN. The MME 113 is responsible for UE 102 tracking and transmissions. The MME 113 is responsible for choosing the S-GW 111 for the UE 102 at the initial attach and at time of intra-LTE handover involving Core Network (CN) node relocation. The MME 113 is also responsible for authenticating the user by interacting with a Home Subscriber Server (HSS) 115. The MME 113 checks the authorization of the UE 102 on a service provider's Public Land Mobile Network (PLMN), handles the security key management, provides the control plane 120 function for mobility between LTE and 2G/3G access networks with the S3 interface terminating at the MME 113 from a Serving GPRS Support Node (SGSN), terminates the S6a interface towards the home HSS 115 for roaming UE 102. The HSS 115 is a central database that contains user-related and subscription-related information, wherein "S6a interface" refers to an interface between MME 113 and HSS 115. The functions of the HSS 115 include functionalities such as mobility management 113, call and session establishment support, user authentication, access authorization.

The S-GW 111 routes and forwards the end-user 102 data, while also acting as the mobility anchor for the user plane during inter-eNodeB 122 handovers and as an anchor for mobility between LTE and other 3rd Generation Partnership Project (3GPP) technologies. The S-GW 111 manages and stores UE 102 data, for example, of the IP service, network internal routing information. The P-GW 112 provides connectivity from the UE 102 to data networks by being the point of exit and entry of traffic for the UE 102. The UE 102 may have simultaneous connectivity with more than one P-GW 112 for accessing multiple network data. The P-GW 112 performs policy enforcement, data filtering for each user.

The P-GW 112 connects to a Policy and Charging Rules Function (PCRF) 117 device, operator services and the network. The PCRF device 117 is responsible for policy control decision-making, as well as for controlling the flow-based charging functionalities in a Policy Control Enforcement Function (PCEF) via Gx interface, which resides in the P-GW 112. Wherein Gx interface is used by the P-GW to communicate with the Policy and Charging Rules Function (PCRF) device 117 in order to handle Policy and Charging Rules. The PCRF device 117 provides quality of service (QoS) authorization, which decides how a data flow is treated in the PCEF and ensures that this is in accordance with the subscriber profile repository (SPR) 116, wherein SPR 116 includes user's subscription plan, post-paid charges, pre-paid charges, etc. SPR 116 and PCRF device 117 uses Sp interface to interact with each other, herein Sp interface refers to an interface that support PCRF device 117 to receive data from SPR 116 The operator services include a network operator's IP services such as IP Multimedia Subsystem (IMS), Packet Switched Streaming (PSS), etc. The network can be the Internet 121 or any other network including content such as video for streaming through the wireless network to the UE 102. Wherein P-GW 112 uses Gz interface to communicate with the offline charging system (non-real time), to send the charging records of the post-paid users and P-GW 112 also uses Gy interface to communicate with the online charging system (real-time) to send the charging records of the pre-paid users.

In an alternate embodiment, broadband core 114 is coupled to the sensing unit 103 and is also coupled to OTT service provider 101 via NAT firewall 119, wherein sensing unit 103 receives a plurality of data from the broadband core 114 and bypasses the control plane 120 and data plane module 107.

Quality of received video in networks, for example RAN networks, depends on a very large set of variables and data, for example, a video code, resolution, bandwidth, transcoding and transrating, network buffer sizes, radio interface available capacity, subscriber device capabilities, for example, screen size, resolution, subscription level, etc. The system 100 utilizes machine learning algorithm for prediction of video performance at UE 102 over mobile communication network, herein the machine learning algorithm includes traditional batch mode learning methods comprises decision trees, support vector machines, Bayesian networks, clustering, ensemble learning algorithms, and Markov Chain Monte Carlo (MCMC) algorithms, supervised, semi-supervised or unsupervised learning mode as well as versions of these algorithms adapted to data stream processing.

Based on the video quality prediction, the machine learning algorithm provides an actionable recommendation to the mobile communication network for addressing QoE issues. Herein actionable recommendation comprises, scaling the resolution or bitrate of the video stream based on the user's subscription plan, etc. These actionable recommendations can be configured to be automatically implemented by the mobile communication network or provided as suggestions for operator approval prior to implementation.

For example, the machine learning algorithm receives video QoE issues from UE 102, when a user is trying to access a video from his/her mobile device. The sensing unit 103 receives the mobile IP and MSISDN of the UE 102 provided by the DHCP server of the mobile network operator (MNO). Simultaneously, sensing unit 103 receives URL of the video and video attributes for which user is viewing a video on his/her device 102. All these data are feed into the machine learning algorithm for allocating required resolution and/or bandwidth for the video which user wants to view on her/his device 102.

The Sensing unit 103 transmits a request to the MNO, AAA server 118 and PCRF device 117 to check the mobile plans of the UE 102 based on the MSISDN and mobile IP information, so as to provide the bandwidth and/or resolution that the user should get based on his/her plan or a group plan or subscribed plan in a real time.

The processing unit 108 is operably coupled to the sensing unit 103, wherein receiving the sensed data from the sensing unit 103 to process the data. The Processing unit 108 analyzes this sensed data to determine that the resolution of the video the user has chosen (or its corresponding bandwidth equivalent) is above a threshold value, if end-user 102 chooses the resolution limit of the video as above a threshold value, provide adjustments while allocating resolution and/or bandwidth of the video to UE 102 over a mobile communication network, wherein threshold value refers to the subscription plan of the end-user 102, for example, the resolution of the video the user 102 has chosen is less than or equal to his/her subscribed mobile plan, and notify user 102 that the maximum allowable resolution (and/or corresponding bandwidth) of video they can view is limited as per their subscribed plan. This involves adding a rule to the existing PCRF device 117 rules, as the PCRF device 117 provides QoS authorization (QoS class identifier and bit rates) that decides how a certain data flow will be treated in the PCEF and ensures that this is in accordance with the user's subscription plan and also could be requiring modifications in eNodeB 122 data. By notifying the user 102 about their maximum allowable resolution, conservation of the bandwidth or resolution of the video is achieved.

The system 100 comprises an acting unit 109, wherein an acting unit 109 is operably coupled to the processing unit 108. This acting unit 109 receives processed data from the processing unit 108 and collects a set of instructions from a machine learning algorithm based on the analysis of the processed data. In one embodiment, interface with the NAT 119 of the MNO, the acting unit 109 does the mapping of the mobile IP and MSISDN; accordingly, the acting unit 109 instructs the OTT platform 101 to stream video, applying adaptive bitrate video and transcoding if required to the video content, to the particular mobile IP and port mapping combination, and transmit the video content to the UE 102 with the adjustments in resolution and/or bandwidth of the video as per user subscription plan, wherein adaptive bit rate video (ABR) adjusts video stream quality in real time by detecting the user's available bandwidth throughout the video session. In ABR, the source content is compressed at multiple bit rates. Each bit rate stream is then partitioned into multiple segments and stored in the server. The stream set has designated segment duration (typically between 2 and 10 seconds) and is divided into uniform segments accordingly. Upon getting a request, the streaming user is provided with a manifest file with the available bit rate streams and the segments of the streams. The user, depending on implementation, selects the video rate that is most appropriate for its needs based on network conditions. In addition to maximizing QoE by minimizing video pauses due to buffering issues when watching a video over an unmanaged network, ABR attempts to provide a good viewing experience to user devices 102.

In one embodiment, using the Interface with the NAT 119 of the MNO, the system 100 does the mapping of the mobile IP and MSISDN; accordingly, the acting unit 109 of the system 100 instructs the OTT platform 101 to stream to the particular mobile IP and port mapping combination, transmit the video file to the UE 102 with the adjustments in resolution and/or bandwidth of the video as per user subscription plan.

The adjustment in the resolution and/or bandwidth of the video as per user subscription plan provides optimizing the resource utilization at OTT platform 101.

In an alternate embodiment, transcoding and/or transrating for the video file of the UE 102 is required at the OTT platform 101, if modification in the bandwidth and/or resolution of the video is not able to apply.

The streaming video, adaptive bitrate video and transcoding of the video required on the content are transmitted from origin place (OTT platform) 101 to the UE 102 via Content Distribution Networks (CDN) 110.

In another embodiment, sensing unit 103 receives video data from the mobile UE 102, for example, cancellation of the video, stops, pauses (for more than a configurable time) or ends the video viewing or quits the video viewing application. Based on these video data, additionally added rules in the PCRF device 117 will be removed automatically. This removing of additional rules from PCRF device 117 ensures that user gets the required bandwidth of the video, only when the user 102 wants to access the video file. This conserves the resources at UE 102 by providing the required bandwidth and/or resolution of the video over a mobile communication network.

The system 100 is operably coupled to the machine learning algorithm, which keeps on collecting the feedback from the UE 102, when a user is accessing the video file from the UE 102. This machine learning performs fine-tuning of its algorithm as per user capabilities of utilizing video resources over the network.

Figure 2:
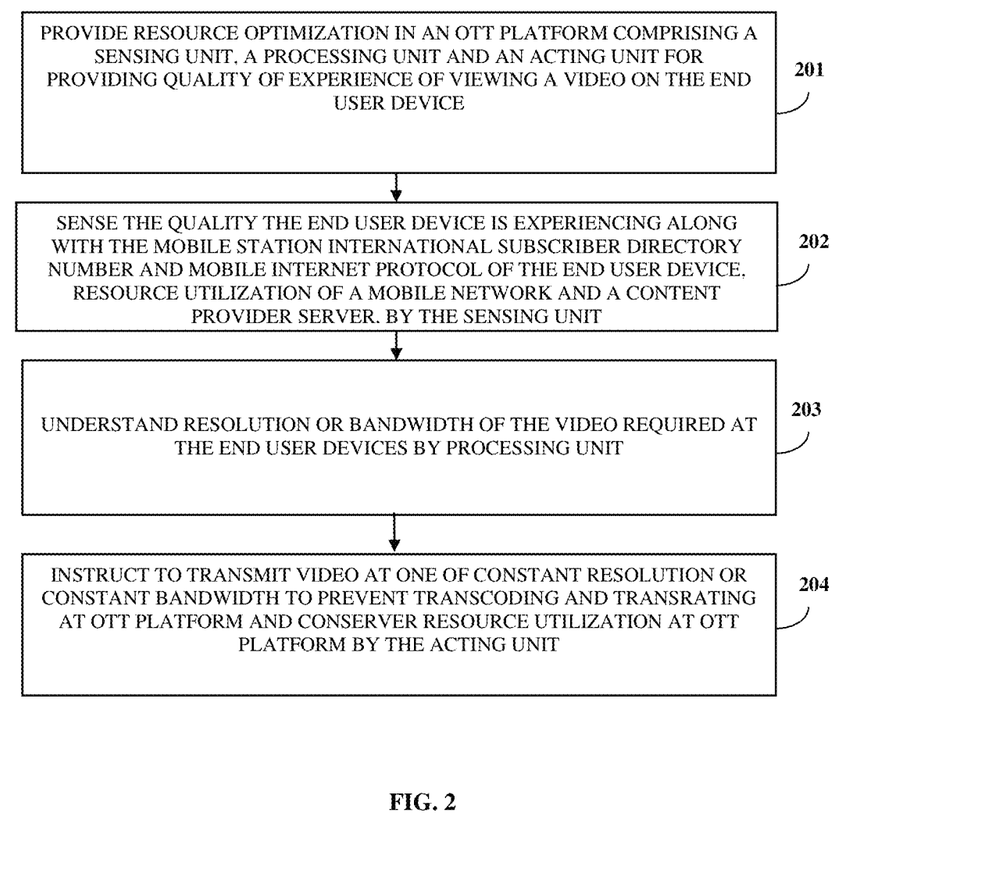
FIG. 2 illustrates a method for resource optimization in an over-the-top (OTT) platform.

FIG. 2 illustrates a method for optimizing resource utilization 201 in an over-the-top (OTT) platform 101 to improve Quality of Experience of viewing a video in one or more of the end-user devices 102 in a mobile communication network. The method disclosed herein employs the system 100 comprising a sensing unit 103 configured to the processing unit 108 for providing quality of experience of viewing a video on the user devices 102. The processing unit 108 is coupled to an acting unit 109 to determine changes required in a resolution of the video to end-user devices 102 and an acting unit 109 commands the OTT 101 to transmit video over a constant bandwidth and/or resolution to each of one or more of the end-user devices 102, which prevents transcoding and transrating at OTT platform 101 and con-server resource utilization at OTT platform 101.

The system 100 comprising a sensing unit 202,103 receiving a plurality of sensory input data from one or more of the end-user devices 102 over a network, for example, Quality the user is experiencing, Mobile Station International Subscriber Directory Number (MSISDN) and Mobile IP of the end-user devices 102, information on radio link strength and quality (RSSI and CINR) from the Mobiles, traffic data, for instance, video statistics, video contents consumed by the end-user device and/or their URLs, when the user is login to view and/or consume the content, current bandwidth and/or the quality of the said videos, the times of viewing, whether any buffering occurred, total number of video bytes consumed, subscriber location, for example, Location Area Code (LAC) and Tracking Area Code (TAC), Node-B/e-Node B details including the Cell IDs, policy applied, user profile, usage of data, policy updates etc., resource utilization in the RAN including radio resources and computational resources comprises, CPU utilization. The sensing unit 103 also receives the actual QoE (Quality of Experience) and the desired QoE obtained in real-time which will be an index that is derived from one or multiple of the above-mentioned data, and also receives input from the user when he/she wants to get enhanced QoE.

In an embodiment, sensing unit 202,103 receives a plurality of sensory data from mobile network operator, for example, mobile station international subscriber directory number (MSISDN), wherein mobile network operator provides MSISDN to each one or more of the end-user devices 102 to identify a mobile phone number internationally, and the mobile internet protocol (IP) address. The network in the system addresses a mobile communication network and/or radio access network (RAN) as defined in 3GPP standards, with NodeBs and/or eNodeBs, the Evolved Packet Core (EPC) including the MME 113, S-GW 111 and P-GW 112. In an embodiment, a rule engine is provided. The rule engine comprises rules defined by a mobile network operator. Furthermore, the rule engine is configured to receive updated rules from the mobile network operator. In an embodiment, the rule engine comprises a machine learning algorithm. The rule engine receives the sensed data from the one or more of the end-user devices 102, the mobile communication network, and the OTT platform 101. The rule engine is configured to determine changes required for the video provided by the OTT platform 101 to the end-user devices 102, if resolution of said video is below a threshold value. The rule engine is configured to set rules for handling complex network slicing operations, depending on the capability of the mobile communication network. For complex network slicing operation, the rule engine is configured to change the set of rules by changing the scheduling policies at the mobile communication network based on the needs of the users 102.

In an embodiment, a sensing unit 202,103 is receiving a plurality of sensory input data from the content provider 101. The "Content" category includes a content server which stores, retrieves and presents content, for instance, multimedia, or a CDN (Content Delivery Network) server 110, an OTT (Over-The-Top) content server 101 or an e-commerce website. Resources at content provider comprise transcoding and transrating resources, computational resources comprises CPU utilization and memory, bandwidth information, real-time vs. non-real-time information, current latency obtained by the end-user device 102 for the service being given to the UE 102, sensing the current security method and/or algorithm used for the service being given to the UE 102 is transmitting sensory data to the processing unit 108 for processing. The OTT 101 content delivery is over the network where the "Network" could be one or more of, but not limited to, a radio access network (RAN), the Mobile Network in 3GPP standards, with Node-Bs/e-Node-Bs, the Evolved Packet Core including the MME, S-GW and P-GW.

The system 100 comprises a processing unit 203,108 receives a plurality of sensory input data from the sensing unit 103 for processing. The processing unit 108 and the rule engine are on a cloud server in a cloud computing environment. As used herein, cloud computing environment refers to a processing environment comprising configurable computing physical and logical resources, for example, networks, servers, storage, applications, services, etc., and data distributed over a network. The cloud computing environment provides on-demand network access to a shared pool of the configurable computing physical and logical resources.

The sensed data, for example, QoE of the video view by the user, video statistics, video contents consumed by the end-user device 102 and/or their URLs, when the user login to view and/or consume the content, current bandwidth and/or the quality of the said videos, the times of viewing, whether any buffering occurred, the total number of video bytes consumed, received from one or more of the end-user devices, transcoding and transrating resources, computational resources comprises CPU utilization and memory, bandwidth information, real-time vs. non-real-time information, current latency obtained by the end-user device 120 for the service being given to the UE 102 received from OTT content provider 101 and MSISDN and the mobile internet protocol (IP) address received from mobile network operator are processed and executed by machine learning algorithm in the system 100, for determining changes in the network to optimize resources at OTT platform 101 in a mobile communication network.

In an embodiment, the processing unit 203,108 operably coupled to the first controller 104, wherein the first controller 104 refers to Cloud and/or centralized radio access network (CRAN) and orchestrator, CRAN connects UE 102 to the cellular antenna, process the data and transmit it to the mobile communication network, herein orchestrator 104 refers to a Software-defined networking (SDN) Orchestration is the process of automatically programming the behavior of the network, so that the network smoothly coordinates with the hardware and the software elements to further support applications and services. The first controller 104 transmits processed data to the off-loader module 105. The processed data are then transmitted to the UE 102 as per user capabilities of utilizing video resources over the network. Another key service for distribution of video content over broadband core 114 wireless networks is the 3GPP Multimedia Broadcast and Multicast Service (MBMS).

In another embodiment, the second controller 106 is operably coupled to the processing unit 108, wherein the second controller 106 comprises the evolved packet core (EPC) network function virtualization (NFV) controller and orchestrator and the second controller 106 is further communicatively coupled to a data plane module 107, wherein data plane module 107 comprises serving gateway (S-GW) 111 and a packet data node gateway (P-GW) 112 to route data through the mobile communication network and to manage quality of service of viewing a video in one or more of the end-user devices 102.

In another embodiment, the EPC 106 includes a Serving Gateway (S-GW) 111, a Packet Data Network (P-GW) gateway 112, and a NAT firewall 119. The eNB 122 uses the S1-AP (Application Protocol) protocol on an S1-MME interface with the MME 113 for control plane traffic, and the eNB 122 uses the General Packet Radio Service (GPRS) Tunneling Protocol (GTP) on an S1-U interface with the S-GW 111 for user plane traffic. Collectively the S1-MME and S1-U interfaces are known as the S1 interface, which represents the interface from eNB 122 to the core EPC 106.

The MME 113 chooses the S-GW 111 for the UE 102 at the initial attach and at time of intra-LTE handover involving Core Network (CN) node relocation. The MME 113 checks the authorization of the UE 102 on a service provider's Public Land Mobile Network (PLMN), handles the security key management, provides the control plane 120 function for mobility between LTE and 2G/3G access networks with the S3 interface terminating at the MME 113 from a Serving GPRS Support Node (SGSN), terminates the S6a interface towards the home HSS 115 for roaming UEs 102, and the like. The HSS 115 is a central database that contains user-related and subscription-related information. The functions of the HSS 115 include functionalities such as mobility management, call and session establishment support, user authentication, access authorization.

The S-GW 111 routes and forwards the user data in the mobile communication network. The P-GW 112 provides connectivity from the UE 102 to data networks.

The P-GW 112 connects to a Policy and Charging Rules Function (PCRF) 117 device, operator services, and the network. The PCRF device 117 is responsible for policy control decision-making, as well as for controlling the flow-based charging functionalities in a Policy Control Enforcement Function (PCEF), which resides in the P-GW 112. The PCRF device 117 provides QoS authorization (QoS class identifier and bit rates) that decides how a certain data flow will be treated in the PCEF and ensures that this is in accordance with the user's subscription plan. The operator services can include a network operator's IP services such as IP Multimedia Subsystem (IMS), Packet Switched Streaming (PSS), etc. The network can be the Internet 121 or any other network including content such as video for streaming through the wireless network to the UE 102.

In another embodiment, the processing unit 203,108 transmits the processed data to OTT platform 101, wherein OTT platform 101 is operably coupled to the sensing unit 103, wherein receiving the sensed data from the sensing unit 103 to process the data. The processing unit 108 process the data to determine that the resolution of the video the user 102 has chosen (and/or corresponding bandwidth equivalent) is less than or equal to his/her subscribed mobile plan, and notify user that the maximum allowable resolution (and/or corresponding bandwidth) of video he/she can view is limited as per their subscribed plan. This involves adding a rule to the existing PCRF rules 117, as the PCRF device 117 provides QoS authorization that decides how a certain data flow will be treated in the PCEF and ensures that this is in accordance with the user's subscription profile and also could be requiring modifications in eNode-B 122 data. By notifying the user 102 about their maximum allowable resolution, conserving of the bandwidth or resolution of the video is achieved.

The system 204,100 comprises an acting unit 109, wherein an acting unit 109 is operably coupled to the processing unit 108. This acting unit 109 receives processed data from the processing unit 108 and collects a set of instructions from the machine learning algorithm based on the analysis of the processed data. In another embodiment, interface with the NAT 119 of the MNO, the system 100 does the mapping of the mobile IP and MSISDN; accordingly, the system 100 transmit instructs to the OTT platform 101 to stream video, applying adaptive bitrate video and transcoding if required to the video content, to the particular mobile IP and port mapping combination, and transmit the video file to the UE 102 with the adjustments in resolution and/or bandwidth of the video as per user subscription plan, wherein adaptive bit rate video (ABR) adjusts video stream quality in real time by detecting the user's available bandwidth throughout the video session. In ABR, the source content is compressed at multiple bit rates. Each bit rate stream is then partitioned into multiple segments and stored in the server. The stream set has designated segment duration (typically between 2 and 10 seconds) and is divided into uniform segments accordingly. Upon a GET request, the streaming client is provided with a manifest file with the available bit rate streams and the segments of the streams. The client, depending on implementation, selects the video rate that is most appropriate for its needs based on network conditions. In addition to maximizing QoE by minimizing video pauses due to buffering issues when watching a video over an unmanaged network, ABR attempts to provide a good viewing experience to user devices 102.

The adjustment in the resolution and/or bandwidth of the video as per user subscription plan helps in optimizing resource utilization (of transcoding/transrating resources) at the OTT platform 101.

In an alternate embodiment, transcoding and/or transrating for the video file of the UE 102 is required at the OTT platform 101, if modification in the bandwidth and/or resolution of the video is not applied.

In another embodiment, sensing unit 103 receives video data from the UE 102, for example, cancellation of the video, stops, pauses (for more than a configurable time) or ends the video viewing or quits the video viewing application. Based on these video data, additionally added rules in the PCRF 117 will be removed automatically. This erases of additional rules from PCRF 117, to ensure that the user gets the bandwidth of the video, only when the user wants to access the video file. This conserver the resources at one or more of the end-user devices 102 by providing the required bandwidth and/or resolution of the video over a mobile communication network.

In another embodiment, machine learning algorithm keeps on collecting the feedback from the UE 102, when user is accessing the video file. This machine learning performs tweaking of its algorithm as per the user needs.

Figure 3A:
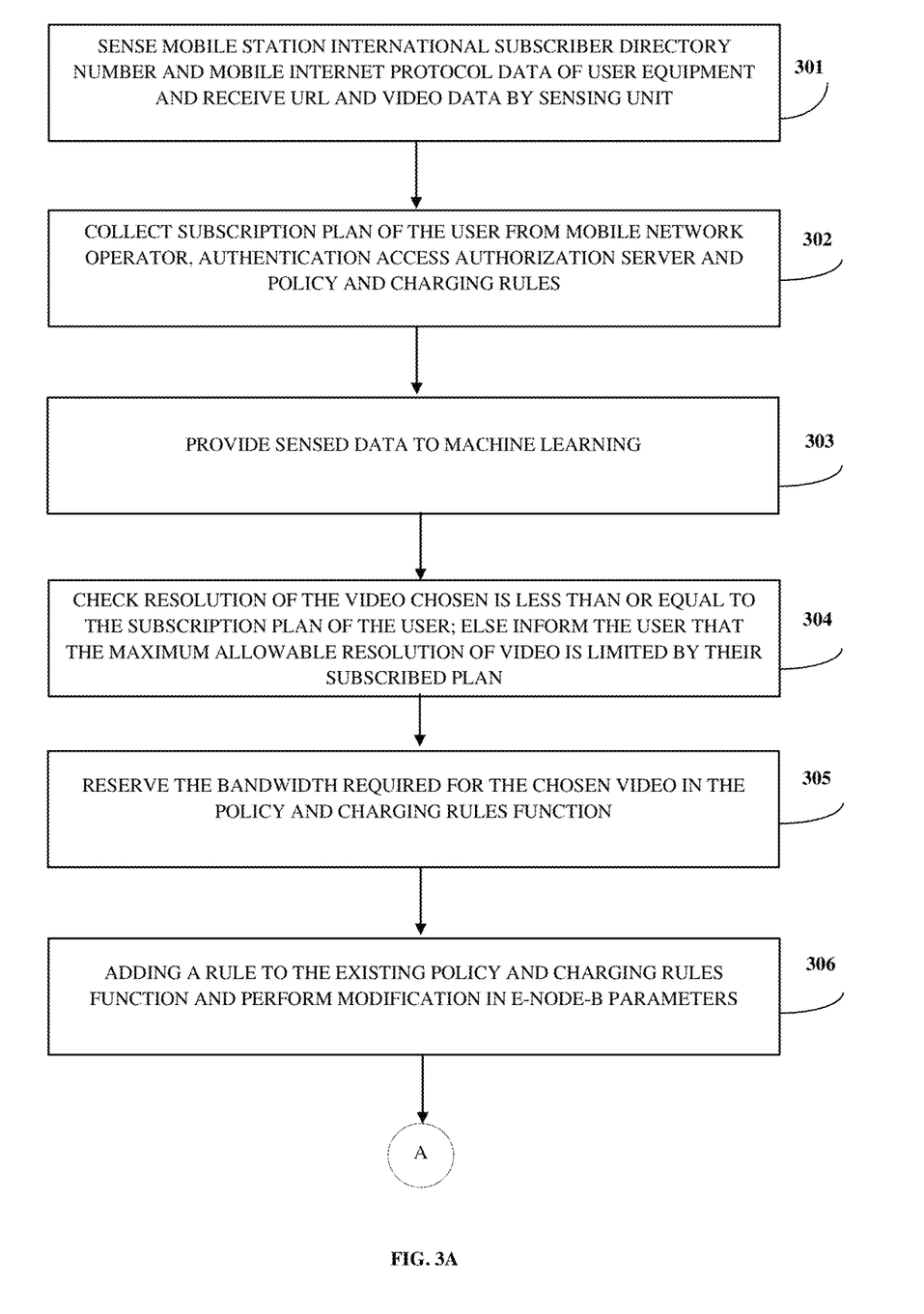
FIGS. 3A and 3B illustrate a flowchart comprising the steps performed to optimize resource utilization in an over-the-top (OTT) platform over a mobile communication network.
Figure 3B:
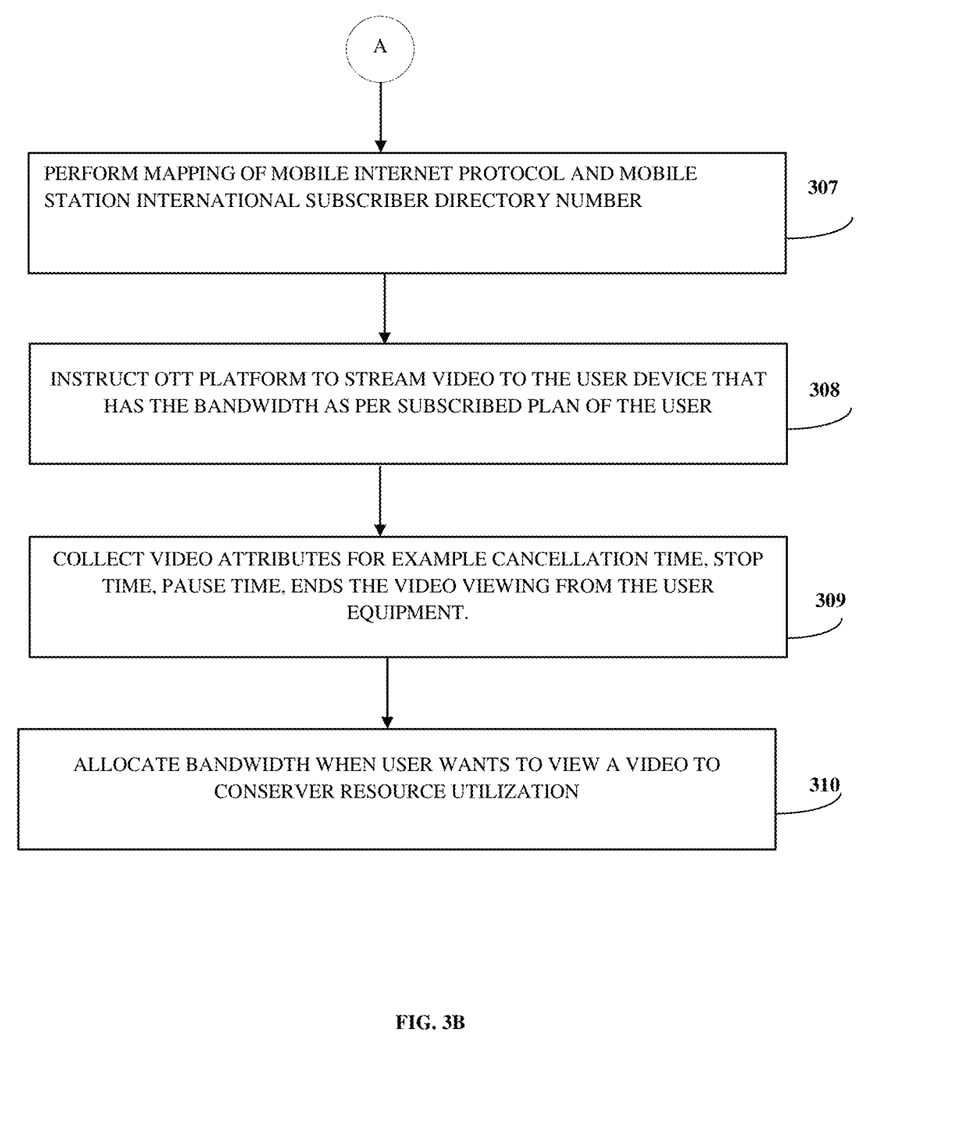

FIGS. 3A and 3B illustrate a flowchart comprising the steps performed by system 100 to optimize resource utilization in an over-the-top (OTT) platform 101 over a mobile communication network. The system 100 is operably coupled to the sensing unit 301 to receive a plurality of inputs from the end-user devices 102, for example, mobile station international subscriber directory number (MSISDN) of one of an individual end-user devices 102 and mobile internet protocol (IP) address, wherein mobile network operator provides MSISDN to each of one or more of the end-user devices 102 to identify a mobile phone number internationally. The Sensing unit 301,103 also receives URL of the video and video attributes for which user is viewing on his/her device 102, the sensed data received by the sensing unit 301,103 is provided to the machine learning for processing the data.

The Sensing unit 302,103 transmits a request to the MNO, AAA server 118 and PCRF device 117 to check the Mobile Plans of the UE 102 based on the MSISDN and mobile IP information, so as to provide the bandwidth and/or resolution that user should get based on his/her plan or a group plan or subscribed plan in a real time.

The processing unit 303,108 is operably coupled to the sensing unit 301,302,103, wherein receiving the sensed data from the sensing unit 103 to process the data. The processing unit 108 is communicatively coupled to the machine learning algorithms via rule engine. This rule engine is coupled to the mobile network operator wherein, mobile network operator provides user device 102 details to the rule engine. This rule engine includes a set of rules that are based on the application running on the user devices 102, for example, video application, resolution of the video, bandwidth for the video, etc.

The machine learning algorithms stored in the rule engine checks 304 the resolution of the video the user device 102 has chosen (or its corresponding bandwidth equivalent) is above a threshold value. If end-user chooses the resolution limit of the video as above a threshold value, then machine learning algorithm provides adjustments while allocating resolution and/or bandwidth of the video to UE 102 over a mobile communication network, wherein threshold value refers to the subscription plan of the end-user 102, wherein subscription plan includes the maximum resolution for the video that can be viewed on the user devices 102.

The machine learning algorithm provides a set of rules to reserve 305 the bandwidth resources to the Policy and charging rules function device 117 based on the user demand for the resolution of the video.

Reserving of the bandwidth involves adding 306 a rule to the existing PCRF device 117 rules, as the PCRF device 117 provides QoS authorization that decides how a data flow will be treated and ensures that this is in accordance with the user's subscription profile and could also be requiring modifications in eNodeB 122 data, this notifies the user to view the video with maximum allowable resolution as per their subscription plan for conserving the bandwidth and/or resolution of the video over a mobile communication network The machine learning performs 307 mapping of received sensed data, for example, mobile internet protocol IP and mobile station international subscriber directory number MSISDN and simultaneously ensures the resolution of the video chosen by end-user devices 102.

The machine learning instructs 308 OTT platform 101 to stream video to the particular mobile IP and port mapping combination, by transmitting the video file to the UE 102 with the adjustments in resolution and/or bandwidth of the video according to the user subscription plan. The adjustment in the resolution and/or bandwidth of the video is performed as per rules added to the exiting PCRF device 117 for reserving the bandwidth as in step 305. If the rules which are added to the exiting PCRF device 117 for reserving the bandwidth is not achieved by the required adjustments in the resolution and/or bandwidth of the video, then transcoding and/or transrating is performed on the video file. Hence, optimization of resource utilization is achieved by preventing transcoding and transrating performance on the video file of the user devices 102.

As per optimizing the resource utilization at OTT platform 101, machine learning analyzes 309 the video data from the user devices 102, for example, cancellation of the video, stop time, pause for more than a configurable time for video viewing application. Based on these video data, additionally added rules in the PCRF device 117 will are removed automatically.

This removing of additional rules from PCRF device 117 ensures that user device 102 gets the required bandwidth of the video. Allocate 310 the required bandwidth for the video file, only when one or more of the end-user devices 102 wants to access the video file. This conserves the resources at the user devices 102 by providing the required bandwidth and/or resolution of the video over a mobile communication network only when required.

The foregoing examples have been provided merely for the purpose of explanation and are in no way to be construed as limiting of the method and the system 100 disclosed herein. While the method and the system 100 have been described with reference to various embodiments, it is understood that the words, which have been used herein, are words of description and illustration, rather than words of limitation. Furthermore, although the method and the system 100 have been described herein with reference to particular means, materials, and embodiments, the method and the system 100 are not intended to be limited to the particulars disclosed herein; rather, the method and the system 100 extend to all functionally equivalent structures, methods and uses, such as are within the scope of the appended claims. Those skilled in the art, having the benefit of the teachings of this specification, may affect numerous modifications thereto and changes may be made without departing from the scope and spirit of the method and the system 100 disclosed herein in their aspects.

I claim:

1. A method for resource optimization in an over-the-top (OTT) platform to improve Quality of Experience (QoE) of viewing a video in one or more end-user devices connected to a mobile communication network, the method comprising:
providing a system communicatively coupled to said one or more end-user devices, said mobile communication network, and said OTT platform through said mobile communication network;
receiving, by said system, said user device sensory data from said one or more end-user devices;
receiving, by said system, said OTT platform sensory data from said OTT platform;
receiving, by said system, said mobile network operator sensory data from said mobile communication network;
processing, by said system, said received user device sensory data, said received mobile network sensory data and said OTT platform sensory data to obtain processed data for determining changes required in a resolution of said video provided to said end-user devices by said OTT platform, if said resolution of said video is below a threshold value; and
providing instructions to said OTT platform to stream said video to one or more of said end-user devices receiving said video with said resolution below said threshold value, wherein said instructions comprise one of:
instructions to transmit said video at a constant resolution at or above said threshold value to each of said one or more of said end-user devices; and
instructions to transmit said video over a constant bandwidth to each of said one or more of said end-user devices, wherein transmitting said video at one of said constant resolution and said constant bandwidth prevents transcoding and transrating at OTT platform and conserves resources at said OTT platform.

2. A system for optimizing resource utilization in an over-the-top (OTT) platform to improve Quality of Experience (QoE) of viewing a video in one or more end-user devices connected to a mobile communication network, said system comprising:
a sensing unit for receiving a plurality of sensory input parameters from said one or more end-user devices, said mobile communication network, and said OTT platform, wherein said sensory input parameters received from said OTT platform comprises transcoding and transrating performed at said OTT platform;
said sensing unit for generating sensed data using said received sensory input parameters;
a processing unit for receiving said generated sensed data and processing said generated sensed data to obtain processed data for determining changes required in a resolution of said video provided to said end-user devices by said OTT platform, if said resolution of said video is below a threshold value; and
an acting unit for providing instructions to said OTT platform to stream said video to one or more of said end-user devices receiving said video with said resolution below said threshold value, wherein said instructions comprise one of:
instructions to transmit said video at a constant resolution at or above said threshold value to each of said one or more of said end-user devices; and
instructions to transmit said video over a constant bandwidth to each of said one or more of said end-user devices, wherein transmitting said video at one of said constant resolution and said constant bandwidth prevents transcoding and transrating at OTT platform and conserves resources at said OTT platform.

3. The system of claim 2, wherein said end-user sensory data comprises traffic parameters, network inputs, and QoE inputs to perform an optimization.

4. The system of claim 3, wherein said QoE inputs comprise mobile IP address, received signal strength indication (RSSI) and Carrier to interference-plus-noise ratio (CINR), and wherein said traffic parameters comprise video statistics, video content consumed by said end-user devices, video URL, bandwidth and quality of said video, the times of viewing, total number of video bytes consumed, and wherein said network inputs comprise location area code (LAC) and tracking area code (TAC) and Cell ID.

5. The system of claim 2, wherein said sensory input parameters received from said mobile communication network comprise mobile station international subscriber directory number (MSISDN) of each of said one or more end-user devices in said mobile communication network.

6. The system of claim 2, wherein said over-the-top (OTT) platform comprises resources for performing said transcoding and said transrating, computational resources comprising CPU, memory, and bandwidth available.

7. The system of claim 2, wherein said sensory input parameters received from said over-the-top (OTT) platform comprises said utilization information of said CPU, utilization of said memory, information of said bandwidth available, real-time vs. non-real-time information, current latency obtained by said one or more end-user devices for a service provided to said one or more end-user devices, one or more of a current security method and an algorithm used for said video provided to said user.

8. The system of claim 6, wherein said over-the-top (OTT) platform is connected to a content delivery network (CDN) to distribute said video stream, adaptive bitrate video and transcoded video to one or more of said end-user devices through said mobile communication network.

9. The system of claim 2, wherein said threshold value is determined based on a subscription plan of each of said one or more of said end-user devices.

10. The system of claim 2, wherein said system comprises a first controller for receiving said processed data from said processing unit, and wherein said first controller is coupled to an off-loader module.

11. The system of claim 10, wherein said first controller is a cloud-radio access network (C-RAN) controller and orchestrator, wherein said off-loader module transmits said processed data required for said video provided by said OTT platform to said end-user devices.

12. The system of claim 2, wherein said system comprises a second controller for receiving said processed data from said processing unit, wherein said second controller is coupled to a data plane module.

13. The system of claim 12, wherein said second controller is an evolved packet core (EPC) network function virtualization (NFV) controller and orchestrator, wherein said data plane module comprises serving gateway (S-GW) and a packet data node gateway (P-GW) for routing data through the mobile communication network and manage quality of service of viewing said video in said one or more end-user devices.

14. The system of claim 2, wherein said mobile communication network comprises one or more of a radio access network comprising one or more of Node-s and e-Node-Bs, an evolved packet core (EPC) network including a mobility management entity (MME), a serving gateway (S-GW), a packet data node gateway (P-GW), a broadband core, a home subscriber server (HSS), a subscriber profile repository (SPR), a policy and charging rules function (PCRF), an authentication authorization and accounting (AAA) server, and a network address translation (NAT).

15. The system of claim 2, wherein said system further comprises a rule engine coupled to said processing unit, wherein said rule engine comprises rules defined by a mobile network operator.

16. The system of claim 15, wherein said rule engine comprises a machine learning algorithm, and wherein said rule engine receives said sensed data from said one or more end-user devices, said mobile communication network, and said OTT platform, and wherein said rule engine determines changes required for said video provided by said OTT platform to said end-user devices, if resolution of said video is below a threshold value.

17. The system of claim 16, wherein said machine learning algorithm provides instructions to OTT platform to stream said video at one of said threshold value and above said threshold value to one or more of said end-user devices receiving said video with said resolution below said threshold value end-user.

18. The method of claim 17, wherein said threshold value is determined based on a subscription plan of each of said one or more of said end-user devices.

19. The method of claim 17, comprises notifying said end-user devices that a maximum allowable resolution for viewing said video is based on a subscription plan of each of said one or more end-user devices.

20. A non-transitory, computer readable storage medium storing instructions that when executed by one or more processors effectuate operations comprising:
   receiving user device sensory data from one or more end-user devices;
   receiving OTT platform sensory data from an OTT platform;
   receiving mobile network operator sensory data from a mobile communication network;
   processing said received user device sensory data, said received mobile network sensory data and said OTT platform sensory data to obtain processed data for determining changes required in a resolution of a video provided to said end-user devices by said OTT platform, if said resolution of said video is below a threshold value; and
   providing instructions to said OTT platform to stream said video to one or more of said end-user devices receiving said video with said resolution below said threshold value, wherein said instructions comprise one of:
   instructions to transmit said video at a constant resolution at or above said threshold value to each of said one or more of said end-user devices; and
   instructions to transmit said video over a constant bandwidth to each of said one or more of said end-user devices, wherein transmitting said video at one of said constant resolution and said constant bandwidth prevents transcoding and transrating at OTT platform and conserves resources at said OTT platform.

* * * * *